(12) United States Patent
Scharrenberg

(10) Patent No.: US 6,254,968 B1
(45) Date of Patent: Jul. 3, 2001

(54) PLASTIC MOULDING AND A PROCESS FOR PRODUCTION THEREOF

(75) Inventor: Alfred Scharrenberg, Köngen (DE)

(73) Assignee: Otto Deuschle Modell-Und Formenbau GmbH & Co. (DE)

( * ) Notice: Subject to any disclaimer, the term of this patent is extended or adjusted under 35 U.S.C. 154(b) by 0 days.

(21) Appl. No.: 09/485,518

(22) PCT Filed: Jul. 20, 1998

(86) PCT No.: PCT/EP98/04525

§ 371 Date: May 18, 2000

§ 102(e) Date: May 18, 2000

(87) PCT Pub. No.: WO99/07534

PCT Pub. Date: Feb. 18, 1999

(30) Foreign Application Priority Data

Aug. 11, 1997 (DE) .............................. 197 34 666

(51) Int. Cl.⁷ .................................. B32B 23/02

(52) U.S. Cl. .................. 428/192; 264/259; 264/261; 264/266; 264/271.1; 264/265; 264/260; 156/299; 156/242; 156/212; 156/294; 156/297.2

(58) Field of Search .................. 264/259, 273, 264/192, 260, 261, 265, 266, 271.1, 527.3, 897.2, 258; 428/101, 130, 192; 156/242, 244.18, 244.2, 244.21, 214, 294, 297.2, 299

(56) References Cited

U.S. PATENT DOCUMENTS

| 5,281,383 | 1/1994 | Ueki et al. ............................. 264/259 |
| 5,486,329 | 1/1996 | Ueki et al. ............................. 264/273 |

FOREIGN PATENT DOCUMENTS

| 19622499A1 | 12/1997 | (DE) . |
| 0684120A1 | 11/1995 | (EP) . |
| 0714760A1 | 6/1996 | (EP) . |
| 2744947 | 8/1997 | (FR) . |
| 2271956A | 5/1994 | (GB) . |
| 2271956 | * 5/1994 | (GB) . |
| 08281704 | * 10/1996 | (JP) . |
| WO96/25282 | 8/1996 | (WO) . |
| WO98/00279 | 1/1998 | (WO) . |

* cited by examiner

Primary Examiner—Merrick Dixon
(74) Attorney, Agent, or Firm—Young & Basile, P.C.

(57) ABSTRACT

Conventional plastic mouldings with several fields of which at least one is laminated with a covering material are produced in a single operation. In order to prevent the covering material from becoming warped in the laminated region, the plastic substrate of the known plastic part is injected into all fields under a low pressure, to the detriment under certain conditions of the quality of the blank fields. The invention therefore proposes to produce during one step the plastic substrate of the blank field from plastics injected under high pressure, and to produce the plastic substrate of the laminated field during another step from plastics injected under a relatively low pressure. Also disclosed is a corresponding moulding tool for producing the disclosed plastic moulding in a conventional press.

11 Claims, 4 Drawing Sheets

PLASTIC MOULDING AND A PROCESS FOR PRODUCTION THEREOF

This invention relates to a plastic moulding and also to a process for production of said plastic moulding.

BACKGROUND OF THE INVENTION

A plastic moulding is described in GB 2 271 956 A. In the latter it is a matter of providing a field that is lined with an elastic layer with a plastic substrate in such a way that in the course of the production process the elastic layer is not compressed and does not lose its elasticity in this manner. The plastic substrate is therefore applied onto the field of the plastic moulding exhibiting the elastic layer in the form of a melt cake which is then press-moulded by the closing of two mould halves. The neighbouring fields of the plastic moulding, on the other hand, in which no elastic layer is located, are injected in conventional manner under high pressure. Nothing is said in GB 2 271 956 A about the material of the plastic substrate in the two fields.

JP 08 281 704 also describes a plastic moulding with at least one blank field next to at least one laminated field; the material of the plastic substrate in both fields, however, is the same.

SUMMARY OF THE INVENTION

It is an object of the present invention to configure a plastic moulding in such a way that it is less costly overall.

This object is achieved by means of a plastic moulding that comprises a plastic substrate with several fields, at least one of said fields being laminated with a covering material and at least one other of said fields being blank, whereby
   a) the plastic substrate of the blank field consists of a plastic which is injected under high pressure, and
   b) the plastic substrate of the laminated field consists of a plastic which is introduced under relatively low pressure and at low rate of flow, wherein the plastic substrate of the blank field is produced from a high-quality plastic and that of the laminated field is produced from a lower-quality plastic.

With the present invention it is recognized for the first time that the material of the plastic substrate in the blank field and in the laminated field does not have to be the same. Rather it is sufficient to produce the plastic substrate of the blank field from a high-quality plastic; the plastic substrate of the laminated field, on the other hand, can be produced from a lower-quality and therefore less costly plastic. By virtue of this configuration it is possible for appreciable cost savings to be achieved, since only for the blank fields, in which the plastic substrate remains visible on the visible side of the finished plastic moulding, is use made of a costly plastic material, whereas for the laminated fields, which often constitute a major part of the plastic moulding and which have a plastic substrate that is concealed on the visible manner of the finished plastic moulding by the covering material, an inexpensive plastic material finds application.

An advantageous further development of this plastic moulding comprises, several fields which are laminated with optionally differing covering materials, between which a blank connecting field is present in each instance. This blank connecting field may be of extremely narrow design. By virtue of the blank connecting field the edge of the covering material is held securely. Above all in the case of differing covering materials, an optically pleasing exterior is created.

A particularly durable and high-quality design of a plastic moulding includes the protruding edge of the covering material of the laminated field being extrusion-coated by the plastic substrate of the adjoining blank field. This blank field may also be a blank connecting field as set forth in the preceding paragraph, which is adjoined by another field which is laminated with optionally differing covering material. By virtue of this further development a detachment of the covering material from the plastic substrate in the edge region of the laminated field is reliably prevented during the lifespan of the plastic moulding.

In the case of the subject-matter of GB 2 271 956 A which was mentioned in the introduction, production of the plastic moulding is effected in such a way that the elastic layer is inserted into the corresponding recess in a moulding cavity, the edges not being secured separately. The slides which, according to FIG. 10 of this printed publication, separate the various moulding cavities from one another do not grip the edges of the elastic layer, so the latter are not fixed. In the course of production of the plastic moulding this can result in the covering material slipping or warping in the moulding cavity.

It is therefore a further object of the present invention to configure a process for production of a plastic moulding in such a way that warping and displacement of the covering material during the production process are ruled out.

This object is achieved by virtue of a process for producing a plastic moulding, in which
   a) the covering material in the moulding cavity pertaining to a moulding tool is firstly brought into a shape already corresponding to that which it exhibits on the finished plastic moulding;
   b) after this the material of the plastic substrate of the laminated field is introduced as a deformable melt cake in almost unpressurized manner into the moulding cavity pertaining to the laminated field and at low rate of flow;
   c) after this the melt cake in the moulding cavity pertaining to the laminated field is press-moulded and distributed;
   d) after this the melt of the plastic substrate of the blank field is injected under high pressure into the corresponding moulding cavity pertaining to the moulding tool,
wherein
   e) after process step a) the edges of the covering material of the laminated field are fixed in such a way that the moulding cavity pertaining to the laminated field is tightly separated from the moulding cavities of the other fields;
   d) the edges of the covering material are released after sufficient solidification of the melt cake.

With the process according to the invention the edges of the covering material are accordingly fixed by a separate measure. Only when either the melt cake in the moulding cavity pertaining to the laminated field has sufficiently solidified or when the edges of the covering material within the solidifying melt of the neighbouring blank field have been sufficiently fixed are the edges released, at which point the plastic moulding is entirely finished. Accordingly, at no time can the edges of the covering material move freely or be displaced; the covering material cannot warp or form creases.

In the case of the variant of the process according to the invention that is specified above, firstly the plastic substrate of the laminated field and subsequently the plastic substrate of the blank field are produced. In this case, the melt cake can be applied into the moulding cavity pertaining to the laminated field, distributed in relatively flat manner over the base area of the die. By this means the rates of flow in the course of press-moulding of the melt cake are further reduced and consequently warpage of the covering material is further avoided.

Particularly cost-effective is the process in which press-moulding of the melt cake in the moulding cavity pertaining to the laminated field is effected by the closing of the moulding tool which is clamped on a normal press.

A variant of the first production process aspect, according to the invention, is a process for producing a plastic moulding, in which
 a) the covering material in the moulding cavity pertaining to a moulding tool is firstly brought into a shape already corresponding to that which it exhibits on the finished plastic moulding;
 b) in a later process step the material of the plastic substrate of the laminated field is introduced as a deformable melt cake under relatively low pressure and at low rate of flow into the corresponding moulding cavity pertaining to the moulding tool;
 c) after process step b) the melt cake is distributed in the moulding cavity by press-moulding,
 d) the melt of the plastic substrate of the blank field is injected under high pressure into the corresponding moulding cavity pertaining to the moulding tool;
wherein
 e) the edges of the covering material are fixed in such a way that the moulding cavity pertaining to the laminated field is tightly separated from the moulding cavities of the other fields;
 f) process step d) is carried out after process step e);
 g) the edges of the covering material are released after sufficient solidification of the melt.

According to this aspect of the invention, the sequence in which the plastic substrates of the laminated field and of the blank field are produced, is inverted in relation to the sequence according to the process variant that is specified previously.

In this case, the melt can be introduced into the moulding cavity pertaining to the film-laminated field, preferably via a low-pressure nozzle. By this means a particularly rapid introduction of the melt cake is possible. This nozzle is preferably a sheet die.

Press-moulding of the melt cake in the moulding cavity pertaining to the laminated field can be effected with the aid of a force plug.

BRIEF DESCRIPTION OF DRAWINGS

The invention is elucidated in more detail below on the basis of two embodiments with reference to the drawing. Illustrated in the latter are.

DESCRIPTION OF THE PREFERRED EMBODIMENT

Figure 1:
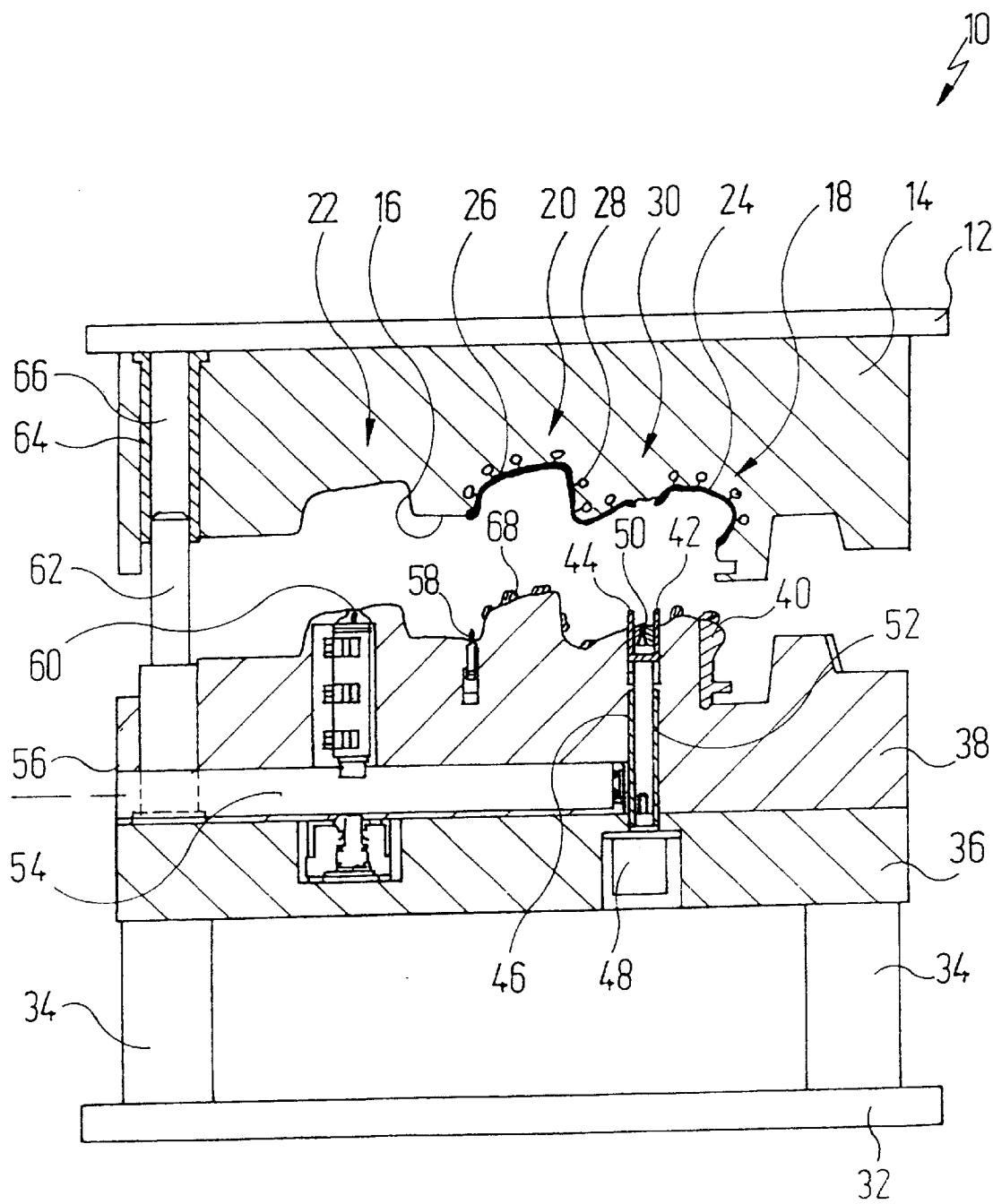
FIG. 1: a vertical partial section through a first embodiment of a moulding tool for a plastic moulding, in the open state.

In FIG. 1 a first embodiment of a moulding tool is provided overall with the reference symbol 10. The vertical press into which the moulding tool 10 is integrated is not represented.

The structure of the upper region of the moulding tool 10 will firstly be elucidated:

The moulding tool 10 comprises an upper connecting plate 12, to which an upper die-part 14 is fastened. The underside of the upper die-part 14 exhibits a moulding recess 16 which reproduces the shape of the plastic moulding to be produced. The moulding recess 16 is subdivided into three fields 18, 20, 22. In the region of the fields 18 and 20, vacuum channels 28 are present in the upper die-part 14 which are provided for the fastening of covering materials 24, 26 for the plastic moulding to be produced. In the region of the field 22 no vacuum channels are provided in the upper die-part 14. By virtue of this field the blank surface is bounded on the plastic moulding to be produced. Analogous remarks apply to the interspace between the fields 18 and 20 which forms a connecting field 30.

The lower region of the moulding tool 10 is constructed in the following manner:

An intermediate plate 36 is fastened to a lower connecting plate 32 via supports 34. A lower die-part 38 is attached to the intermediate plate 34. The upper surface of the lower (lie-part 38 extends substantially parallel to the underside of the upper die-part 14 and is spaced from the latter in defined manner in the region of the moulding recess 16. The moulding cavity which is formed between the upper die-part 14 and the lower die-part 38 in the region of the moulding recess 16 serves to receive the melt or the melt cake of the plastic substrate of the plastic moulding to be produced, which is dealt with in detail further below. In the right-hand region of the lower die-part 38, below the field 18, an internal slide 40 is arranged which reproduces the inner contour of the outer edge of the field 18 of the plastic moulding to be produced. The internal slide 40 is optionally attached displaceably with a horizontal motion component, in order to be able to release an undercut on the finished plastic moulding.

Below the left-hand edge of the field 18 there is arranged a first frame slide 42 and below the right-hand edge of the field 20 there is arranged a second frame slide 44, which are capable of being vertically displaced by a common hydraulic unit 48 via a rod linkage 46 which is only partly visible in FIG. 1. The hydraulic unit 48 is vertically supported on the intermediate plate 36. In the region of the connecting field 30 a needle shut-off nozzle 50 is furthermore present which is only represented schematically in FIG. 1 and which communicates via a vertical channel 52 with a horizontal channel 54 which passes through the lower die-part 38 and opens into a lateral end face 56 of the lower die-part 38.

Below the left-hand edge of the field 20 there is arranged in the lower die-part 38 a third frame slide 58 which is connected, via a rod linkage which is not represented, to the hydraulic unit 48 pertaining to the first two frame sides 42, 44 and is consequently capable of being vertically displaced jointly with the latter. For reasons which are elucidated in detail further below, in the open state of the moulding tool 10 which is represented in FIG. 1 the frame slides 42, 44, 58 protrude clearly upwards above the upper side of the lower die-part. In the region of the blank field 22 the lower die-part 38 exhibits another needle shut-off nozzle 60 which likewise communicates with the horizontal channel 54.

A guide pin 62 which is firmly anchored in the lower die-part 38 is slidably received in an insert 64 pertaining to a guide bore 66 in the upper die-part 14.

At this point attention will be drawn to the fact that the moulding tool 10, just like the plastic moulding to be produced in it, is a three-dimensional entity. In FIG. 1, as in the following Figures, the third dimension, in which, above all, further nozzles, slides or the like may be located, is not represented, unless attention is drawn to this expressly.

Production of a plastic moulding in the moulding tool 10 proceeds in the following manner:

As already mentioned, the moulding tool 10 is integrated into a vertical press which is not represented, the upper connecting plate 12 being connected to the mobile part of the press and the lower connecting plate 32 being connected to the stationary part of the press. At the start of the production process the press as represented in FIG. 1 is open, so that the upper die-part 14 and the lower die-part 38 are spaced from one another. The covering materials 24, 26 are applied in the corresponding regions onto the wall of the upper die-part 14 and are held there by application of an underpressure by virtue of the vacuum channels 28. The covering materials 24, 26 may optionally be preformed in a preparatory step, for example by deep drawing. The covering materials 24, 26 may be films, textile fabrics, leather appliques etc. The frame slides 42, 44 and 58 are in the extended state; that is to say in a vertically upper position.

In the next step the melt cakes 68 of the plastic substrate are applied onto the upper side of the lower die-part 38 in the regions of the laminated fields 18 and 20 by a numerically controlled robot (not represented). Application is effected in this case in strands of zigzag-type design, for example, in order to keep the distances to be travelled by the melt cakes 68 in the course of the later press-moulding process as short as possible. A plurality of individual, discrete melt cakes can also be distributed by the robot. In any case, the total quantity of melt cakes 68 must be such that in the course of the subsequent press-moulding (see below) the moulding cavities that Eire assigned to the fields 18 and 20 are filled out precisely. The material of the plastic substrate is an inexpensive plastic material which is optionally no longer entirely liquid.

After the application of the melt cakes 68 into the regions of the lower die-part 38 that are assigned to the fields 20 and 22, the upper die-part 14 is brought slowly downwards by the mobile part of the vertical press. In the process the upper die-part 14 firstly comes into contact with the frame slides 42, 44 and 58 which protrude clearly above the upper side of the lower die-part 38. Now the frame slides 42,44 and 58 which are in abutment against the upper die-part 14 are moved downwards by the upper die-part 14 contrary to the hydraulic actuating force of the frame slides 42,44, 58, so that during the final part of the path of displacement of the upper die-part 14 the partial moulding cavities of the fields 18,20 and 22 are tightly separated from one another and the edges of the covering materials 24 and 26 of the laminated fields 18 and 20 are fixed. The maximal hydraulic actuating force of the hydraulic unit 48 is less than the actuating force of the vertical press moving the upper die-part 14.

Figure 2:
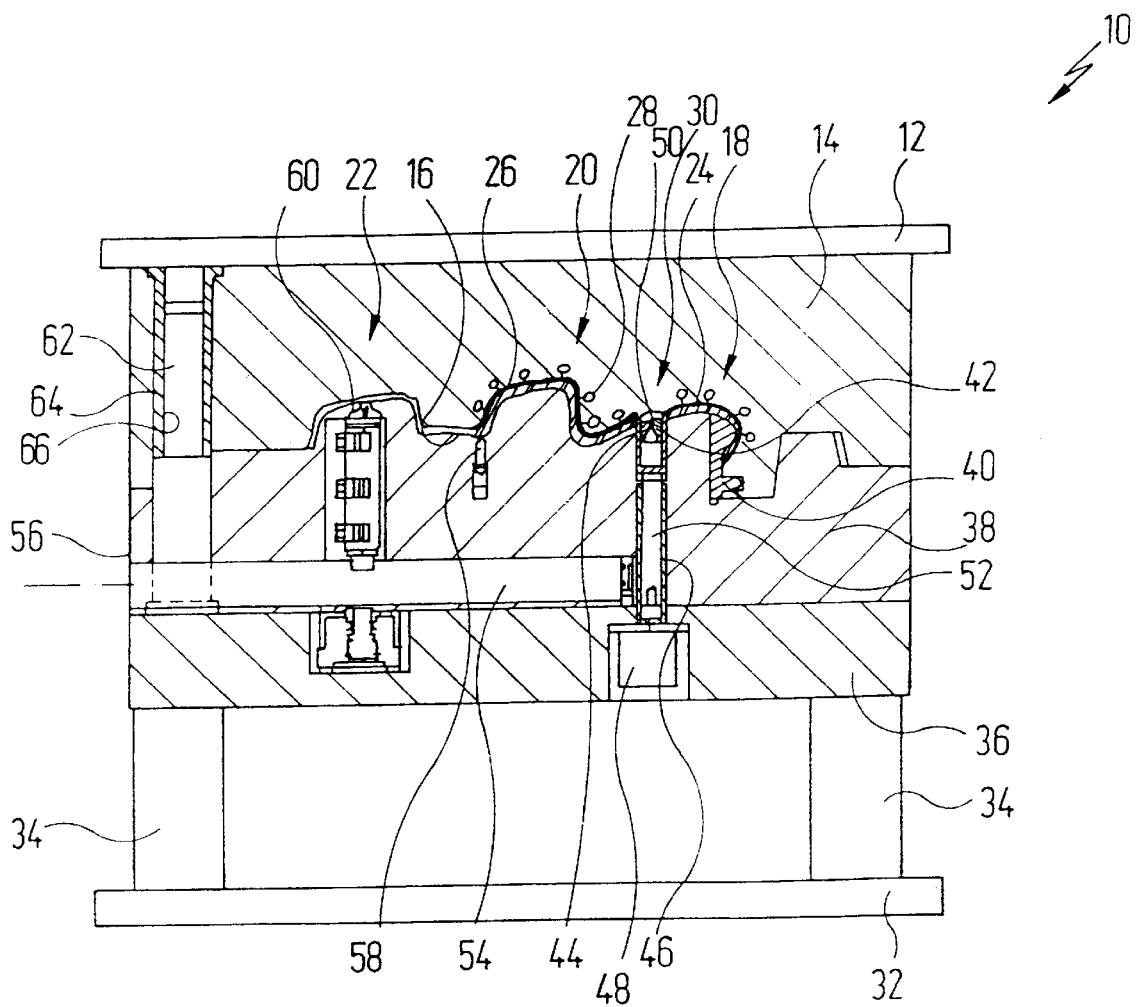
FIG. 2: a vertical partial section through the moulding tool of FIG. 1, in the closed state.

When the upper die-part 14 is lowered further, the melt cakes 68 which are distributed in relatively flat manner over the base area of the lower die-part 38 are pressmoulded. When the upper die-part 14 has arrived at the lower end position (cf. FIG. 2) the moulding cavities in the region of the laminated fields 18 and 20 are totally filled out by the melt cakes 68. By means of the guide pin 62 and the bore 68 with the insert 66, the movement of the upper die-part 14 relative to the lower die-part 38 is guided in precisely matching manner.

Figure 3:
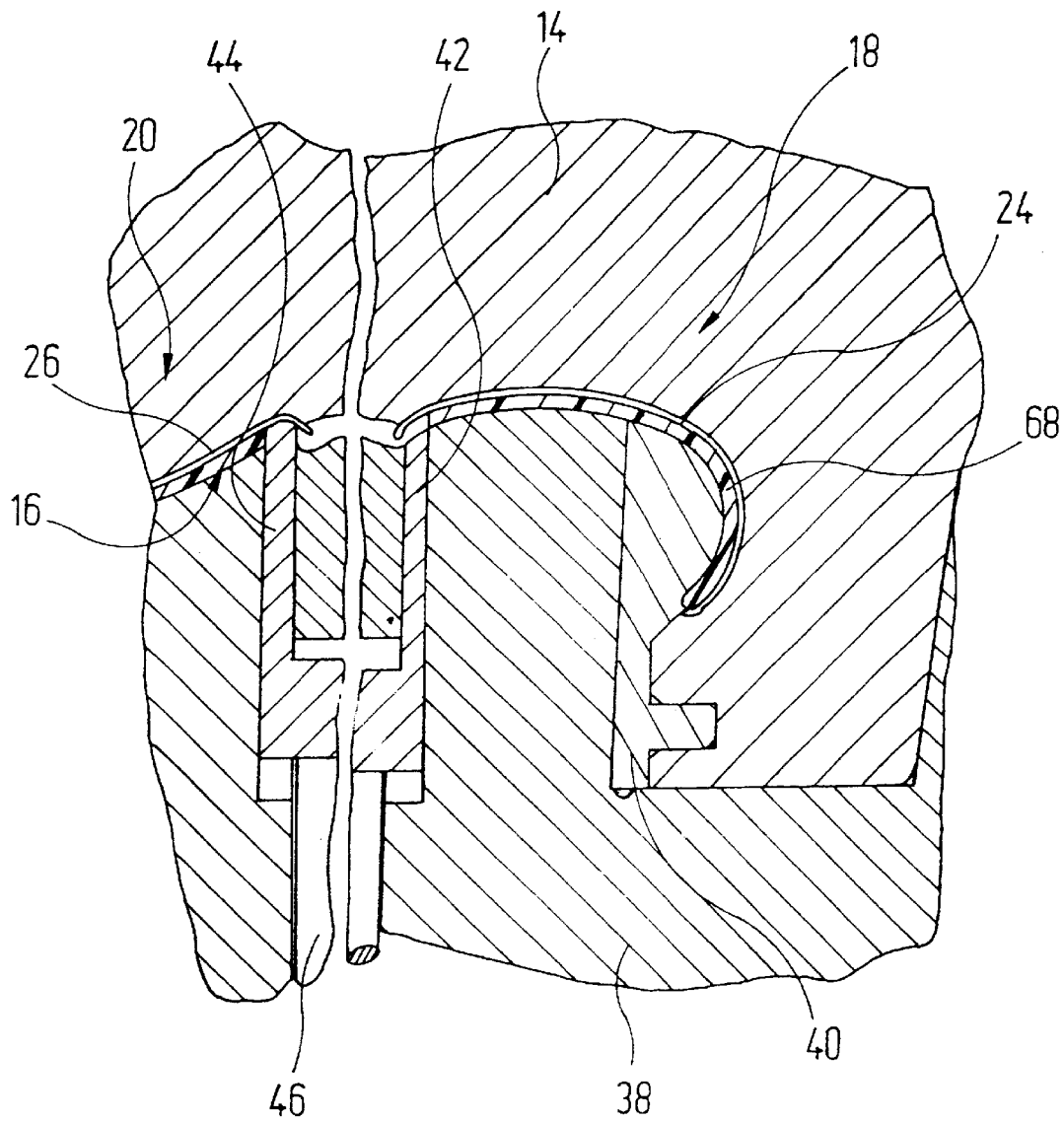
FIG. 3: a vertical section through a detail of the moulding tool of FIG. 1 after the first working step.

After sufficient solidification of the melt cakes 68 the frame slides 42, 44 and 58, actuated by the hydraulic unit 48, travel back downwards and in this way release the edges of the covering materials 24 and 26. This state is represented in exemplary manner for the field 18 and the frame slide 42 on the right-hand side of FIG. 3. Via the needle shut-off nozzles 50 and 60 (not visible in FIG. 3), hot melt (not represented) of a high-grade plastic substrate is now injected under high pressure into the moulding cavities of the blank field 22 and of the connecting field 30. The hot melt is made available by an injection unit (not represented) which is coupled to the orifice of the horizontal channel 54 in the lateral end face 56. In the course of injection of the melt into the moulding cavities that are assigned to the blank field 22 and to the connecting field 30 the bare edges of the covering materials 24 and 26 of the laminated fields 18, 20 are extrusion-coated by the melt and, after the solidification thereof, held securely. The edges of the solidified melt cakes 68 pertaining to the laminated fields 18, 20 are fused again by the hot melt, as a result of which a good connection between the individual fields is achieved.

After the solidification of the melt of the blank field 22 and of the connecting field 30 the upper die-part 14 is displaced vertically upwards by the mobile part of the press, so that the finished plastic moulding can be removed.

Figure 4:
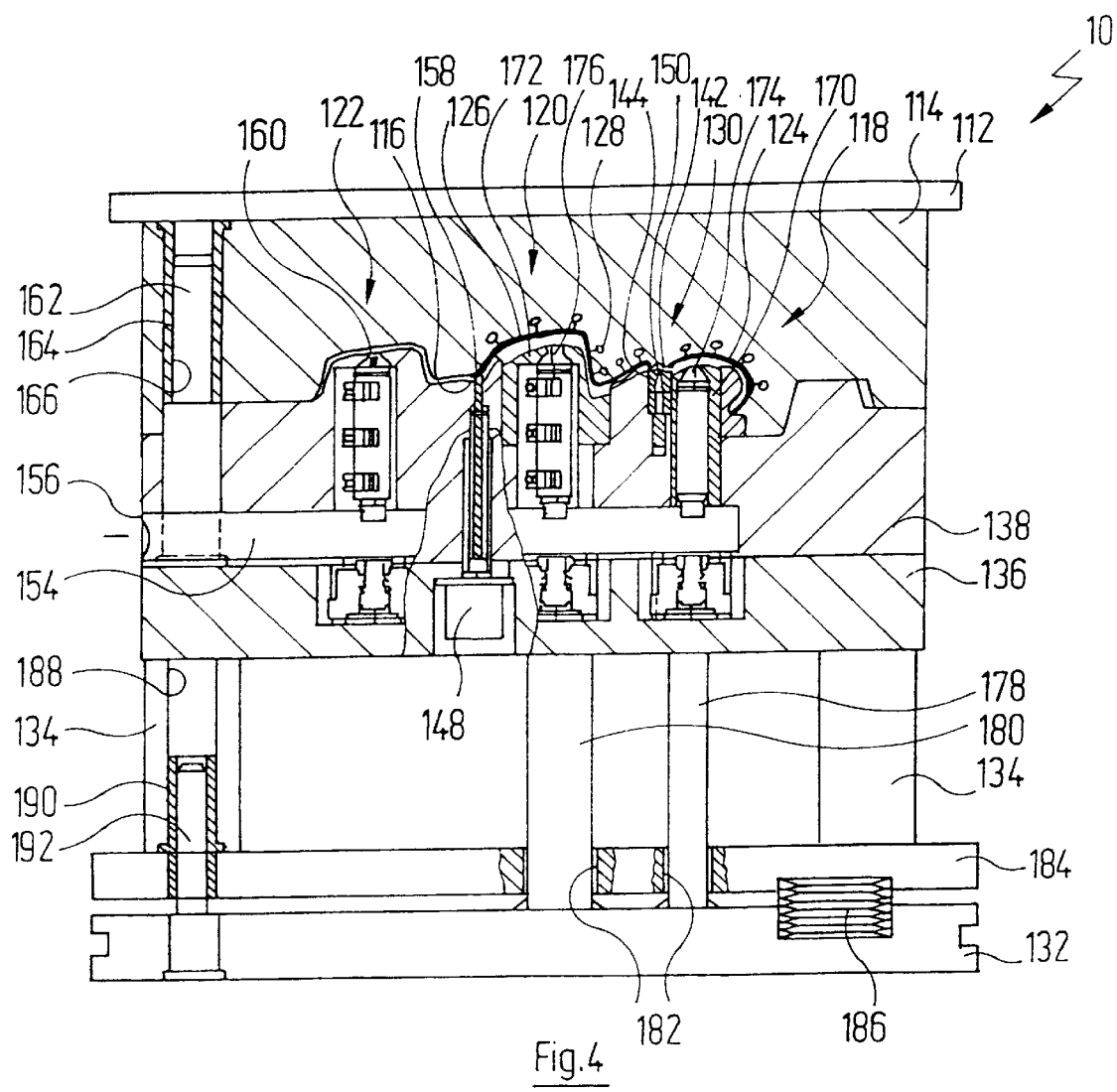
FIG. 4: a vertical partial section through a second embodiment of a moulding tool for a plastic moulding.

Reference will now be made to FIG. 4, in which a second embodiment of a moulding tool for the production of a plastic moulding is represented. Those parts which correspond to those of the first embodiment are not elucidated again below and are provided with the same reference symbols as in FIGS. 1 to 3, with the addition of 100.

In contrast with the first embodiment, in the case of the moulding tool 110 which is represented in FIG. 4 vertically mobile force plugs 170 and 172 are present in the regions of the lower die-part 138 that are assigned to the fields 118 and 120 which are laminated with covering materials 124 and 126. A low-pressure sheet die 174, 176 is arranged, respectively, in the force plugs 170, 172. The low-pressure sheet dies 174 and 176 are connected to the horizontal channel 154. In an embodiment which is not represented, a separate horizontal channel is present for the low-pressure sheet dies 174, 176.

The force plugs 170, 172 are substantially rigidly fastened to the lower connecting plate 132 via rods 178, 180 at least in the vertical direction. The rods 178, 180 are passed through bores 182 through a supporting plate 184 which is supported on the lower connecting plate 132 via a spring cushion 186. Unlike in the case of the first embodiment, the intermediate plate 136 is not fixed via the supports 134 to the lower connecting plate but to the supporting plate 184. In the left-hand support 134 a guide bore 188 is present, into which an insert 190 is introduced. A guide pin 192 is fastened to the lower connecting plate 132 and is slidably received in the insert 190.

Also in connection with FIG. 4, attention is drawn to the fact that the third dimension, in which, above all, further nozzle, slides or the like may be located, is not represented in this FIG.

The moulding tool 110 is used in the following manner:

Analogously to the first embodiment, the upper connecting plate 112 is connected to the mobile part of a vertical press and the lower connecting plate 132 is connected to the stationary part of a vertical press. At the start of the process for producing the plastic moulding, after the insertion of the covering materials 124, 126 the upper die-part 114 is lowered slowly downwards until the regions of the upper die-part 114 and of the lower die-part 138 situated outside the moulding recess 116 come into contact with one another in substantially force-free manner. Consequently the spring cushion 186 still remains in its maximally outward-deflected position, that is to say the lower die-part 138 is held in a vertically upper position via the supports 134 and the intermediate plate 136. The length of the rods 178 and 180 and the length of the spring cushion 186 in the unloaded state are matched to one another in such a way that in this state the force plugs 170 and 172 are in a slightly retracted position relative to the wall of the moulding cavity 116 of the lower die-part 138.

The edges of the covering materials 124 and 126 are now fixed by the frame slides 142, 144 and 158 in such a way that the moulding cavities of the laminated fields 118 and 120 are tightly separated by the blank field 122 and the connecting field 130, respectively.

Now the melt of a high-grade plastic (not represented) is conveyed via the channel 154 to the needle shut-off nozzles 150 and 160 and from there is injected under high pressure into the moulding cavities that are assigned to the blank field 122 and to the connecting field 130. By virtue of the high pressure and the high-grade quality of the plastic material a high surface quality of the blank field 122 and of the connecting field 130 on the finished plastic moulding is guaranteed. The edges of the covering materials 124, 126 protruding beyond the frame slides 142, 144, 158 into the blank fields 122, 130 are extrusion-coated by the melts and, after the solidification thereof, fixed by the plastic substrate which has been formed.

After sufficient solidification of the melts the frame slides 142,144 and 158 are retracted by the hydraulic unit 148 and the rod linkage 146. Now the material of the plastic substrate of the laminated fields 120 and 118 is supplied via the channel 154 to the low-pressure sheet dies 174 arid 176. Via these low-pressure sheet dies 174, 176 the melt cakes (not represented) are introduced in almost unpressurized manner into the moulding cavities that are assigned to the laminated fields 118, 120.

After this the press is actuated in such a manner that the upper die-part 114 moves downwards, and by this means the lower die-part 138 is pushed downwards via the intermediate plate 136, the supports 134 and the supporting plate 184 contrary to the spring tension of the spring cushion 186. The movement of the lower die-part 138 is guided at the same time via the guide pin 192. As a result of this movement, the upper die-part 114 is moved downwards jointly with the lower die-part 138 relative to the force plugs 170, 172 which are substantially rigidly fastened to the lower connecting plate 132. By this means the melt cakes in the moulding cavities of the laminated fields 118, 120 are press-moulded until such time as the moulding cavities have been totally filled out.

Press-moulding of the melt cakes is preferably effected at a time when the melt in the moulding cavities of the blank field 122 and of the connecting field 130 has not yet cooled completely, so that a good connection between the plastic substrates of the laminated fields and the plastic substrates of the blank fields is achieved. After sufficient solidification of the plastic substrate of the laminated fields 118, 120 the upper press-part is retracted with the upper die-part 114 which is fastened thereto, so that the plastic moulding can be removed.

The injection unit (not represented) is connected to the horizontal channel 154 which is introduced in the vertically displaceable lower die-part 138 via a deflecting device (not represented) that exhibits an inlet in the direction towards the injection unit and several switchable, channel-side outlets at differing vertical heights. By this means the connection from the injection unit to the channel is also guaranteed in differing vertical positions of the lower die-part 138.

What is claimed is:

1. A plastic moulding comprising:
   a plastic substrate with several fields, at least one of said fields being a laminated field with a covering material and at least one other of said fields being a blank field, wherein
   a) the plastic substrate of the blank field is a high quality, high pressure injection moulded plastic, and
   b) the plastic substrate of the laminated field is a low quality, low pressurized plastic.

2. A plastic moulding as set forth in claim 1, comprising several laminated fields with, optionally, differing covering materials, and a blank connecting field between each laminated field.

3. A plastic moulding as set forth in claim 1, wherein the covering material of the laminated field has a protruding edge having an extrusion-coating from the plastic substrate of the adjoining blank field.

4. A process for producing a plastic moulding having a plastic substrate with several fields including at least one laminated field with a covering material and at least one blank field, the process comprising the steps of:
   a) first bringing a covering material in a moulding cavity pertaining to a moulding tool into a shape already corresponding to the covering material on the desired finished plastic moulding;
   b) then introducing material of a plastic substrate of the laminated field as a deformable melt cake in an almost unpressurized manner into the moulding cavity pertaining to the laminated field and at low rate of flow;
   c) then press-moulding and distributing the melt cake in the moulding cavity pertaining to the laminated field;
   d) then injecting the melt of the plastic substrate of the blank field under high pressure into the corresponding moulding cavity pertaining to the moulding tool,
   wherein
   e) after process step a) the edges of the covering material of the laminated field are fixed in such a way that the moulding cavity pertaining to the laminated field is tightly separated from the moulding cavities of the other fields; and
   f) the edges of the covering material are released after sufficient solidification of the melt cake.

5. A process as set forth in claim 4, wherein the melt cake is introduced into the moulding cavity pertaining to the laminated field, distributed in a relatively flat manner over the base area of the die.

6. A process as set forth in claim 4, wherein press-moulding of the melt cake in the moulding cavity pertaining to the laminated field is effected by the closing of the moulding tool which is clamped on a normal press.

7. A process for producing a plastic moulding having a plastic substrate with several fields including at least one laminated field with a covering material and at least one blank field, the process comprising the steps of:
   a) first bringing the covering material in the moulding cavity pertaining to a moulding tool into a shape already corresponding to that which the covering material exhibits on the finished plastic molding;
   b) in a later process step, introducing the covering material of the plastic substrate of the laminated field as a deformable melt cake under relatively low pressure and at low rate of flow into the corresponding moulding cavity pertaining to the moulding tool;

c) after process step b) distributing the melt cake in the moulding cavity by press-moulding;

d) injecting a melt of the plastic substrate of the blank field under high pressure into the corresponding moulding cavity pertaining to the moulding tool;

wherein e) the edges of the covering material are fixed in such a way that the moulding cavity pertaining to the laminated field is tightly separated from the moulding cavities of the other fields;

f) process step d) is carried out after process step e); and g) the edges of the covering material are released after sufficient solidification of the melt.

8. A process as set forth in claim 7, wherein the melt is introduced into the moulding cavity of the film-laminated field via a low-pressure nozzle.

9. A process as set forth in claim 7, wherein press-moulding of the melt cake in the moulding cavity pertaining to the laminated field is effected with the aid of a force plug.

10. A plastic molding comprising:

a plastic substrate having a plurality of fields including at least one laminated field with a covering material and at least one blank field, wherein said plastic substrate of the blank field is a high quality, high pressure injection moulded plastic and said plastic substrate of the laminated field is a lower quality, low pressurized plastic and wherein said plastic moulding is manufactured in accordance with the process of claim 4.

11. A plastic molding comprising:

a plastic substrate having a plurality of fields including at least one laminated field with a covering material and at least one blank field, wherein said plastic substrate of the blank field is a high quality, high pressure injection moulded plastic and said plastic substrate of the laminated field is a lower quality, low pressurized plastic and wherein said plastic moulding is manufactured in accordance with the process of claim 7.

* * * * *